United States Patent [19]

Magee

[11] 3,903,289

[45] Sept. 2, 1975

[54] 4-METHYL-3-METHYLCARBAMYLOXIMINOTETRA-HYDROTHIAPYRAN USED TO CONTROL INSECTS AND ACARIDS

[75] Inventor: Thomas A. Magee, Mentor, Ohio

[73] Assignee: Diamond Shamrock Corporation, Cleveland, Ohio

[22] Filed: Sept. 13, 1973

[21] Appl. No.: 397,007

Related U.S. Application Data

[60] Continuation of Ser. No. 187,177, Oct. 6, 1971, abandoned, which is a division of Ser. No. 28,097, April 13, 1970, abandoned, which is a continuation-in-part of Ser. No. 839,641, July 7, 1969, abandoned.

[52] U.S. Cl. .................................................. 424/275
[51] Int. Cl.$^2$ ...................... A01N 9/00; A01N 9/12
[58] Field of Search ..................... 424/275; 260/327

[56] References Cited

UNITED STATES PATENTS

| | | | |
|---|---|---|---|
| 3,223,585 | 12/1967 | Addor | 424/275 |
| 3,755,364 | 8/1973 | Magee | 260/327 TH |

*Primary Examiner*—Albert T. Meyers
*Assistant Examiner*—Leonard Schenkman
*Attorney, Agent, or Firm*—Timothy E. Tinkler

[57] ABSTRACT

Pesticidally active 3-(N-alkylcarbamyloximino)-saturated heterocyclic compounds have been prepared. These compounds are useful in combating undesirable pests such as insects, acarids, nematodes, viruses, and the like.

1 Claim, No Drawings

4-METHYL-3-METHYLCARBAMYLOXIMINOTETRA-HYDROTHIAPYRAN USED TO CONTROL INSECTS AND ACARIDS

CROSS REFERENCE TO RELATED APPLICATIONS

This is a continuation of application Ser. No. 187,177, filed Oct. 6, 1971, now abandoned, which is a division of Ser. No. 28,097, filed Apr. 13, 1970, now abandoned, which is a continuation-in-part of Ser. No. 839,641, filed July 7, 1969, now abandoned.

BACKGROUND OF THE INVENTION

1. Field of the Invention

This invention relates to novel organic compounds and more particularly to a novel class of 3-(N-alkylcarbamyloximino)-saturated heterocyclic compounds and methods for their preparation (a) by reaction of a lower alkyl isocyanate with the appropriate oxime or (b) by reaction of the appropriate oxime with phosgene followed by reaction with the appropriate amino. The principal object of this invention is the utilization of these alkylcarbamyloximino compounds as active components in pesticidal formulations such as formulations for use as insecticides, acaricides, nematocides, and the like.

2. Description of the Prior Art

The first synthetic carbamate insecticides were reported around 1947. The alcohol precursor in many of these carbamates has been a substituted phenol, a naphthol or a heterocyclic hydroxy compound. More recently N-alkylcarbamates of oximes and thichydroxamic acid esters have been reported.

U.S. Pat. No. 3,223,585 presents substituted carbamic acid esters of oximes of cyclic ketosulfides and substituted carbamic acid esters of cyclic thiohydroxamic acid esters of the following respective structures:

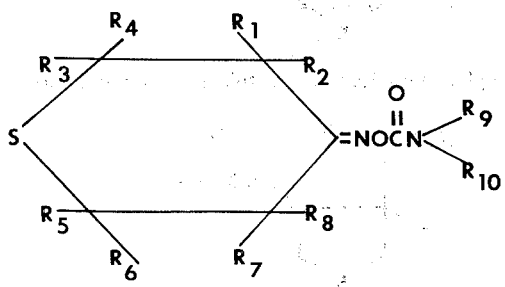

(I)

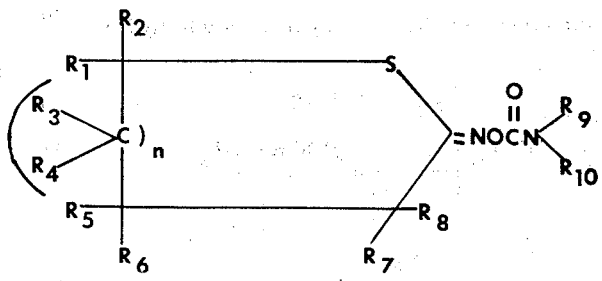

(II)

where $R_1$ to $R_8$ inclusive are substituents selected from the group consisting of hydrogen and lower alkyl; n is an integer of 0 to 1; $R_9$ represents a substituent selected from the group consisting of hydrogen and lower alkyl and $R_{10}$ stands for lower alkyl. In these compounds the sulfur and the carbonyl carbon are in a 1,2 or a 1,4 relationship; that is, they are separated by none or by two carbon atoms. In view of the apparent correlation of structure to pesticidal activity of the alkylcarbamates and the reported activity of these cyclic compounds containing the sulfur and the carbamyl group in a 1,2 or a 1,4 relationship shown in this patent, one would not predict compounds containing these groups in other than such a 1,2 or 1,4 relationship to exhibit high pesticidal activity. We have now found, surprisingly, that N-alkylcarbamates of oximes of cyclic ketosulfides in which the sulfur and the carbamyl carbon are in a 1,3 relationship, that is, they are separated by one carbon atom, exhibit outstanding activity as insecticides, acaricides and nematocides when utilized by contact or when utilized systemically. We have also found that N-alkylcarbamates of oximes of cyclic keto-oxides in which the oxygen and the carbamyl carbon are in a similar 1,3-relationship, exhibit high pesticidal activity.

DESCRIPTION OF THE PREFERRED EMBODIMENTS

The novel 3-(N-alkylcarbamyloximino)-saturated heterocyclic compounds prepared in accordance with the present invention may be represented by the general formula:

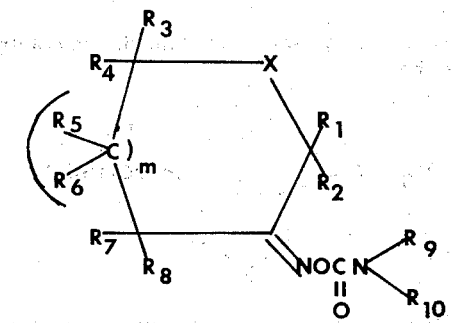

where X is -O-,

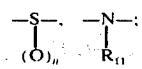

$n$ is an integer of 0, 1 or 2; $m$ is an integer of 0 or 1; $R_1$ through $R_8$ can be hydrogen, lower alkyl, a cycloalkyl ring, alkenyl, alkoxy, thioalkoxy, phenyl, carboalkoxy, with the provision that any two groups of $R_1$ through $R_8$ may be connected to form a cyclic ring; and $R_9$, $R_{10}$ and $R_{11}$ are hydrogen or lower alkyl. The term lower alkyl is used in its accepted chemical meaning of a carbon chain of from 1 to 6 carbon atoms. Also included are novel, pesticidally active intermediates listed as follows: 2,4,4-trimethyltetrahydrothiophen-3-one; 2,2-dimethyl-3-carbethoxytetrahydrothiophen-4-one and 2,2-dimethyltetrahydrothiophen-4-one.

It has been found that carbamates of oximes of 5- and 6-membered cyclic ketosulfides bearing this 1,3-relationship of the sulfur to the keto group possess outstanding insecticidal, acaricidal, miticidal, and in some cases nematocidal activity. In these compounds, there is only one carbon position between the sulfur position and the oxime carbon position.

CHEMICAL COMPOUNDS - NAMES AND STRUCTURES

Representative of the novel, pesticidally active compounds within the teaching of the foregoing general structure are:

3-methylcarbamyloximinotetrahydrothiophene

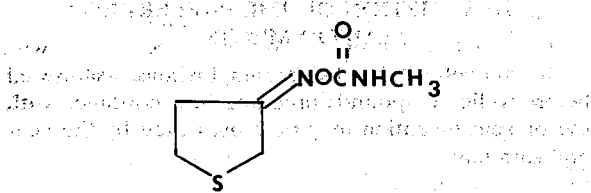

3-carbomethoxy-4-methylcarbamyloximinotetrahydrothiophene

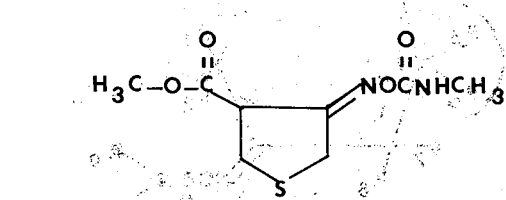

2-carbomethoxy-3-methylcarbamyloximinotetrahydrothiophene

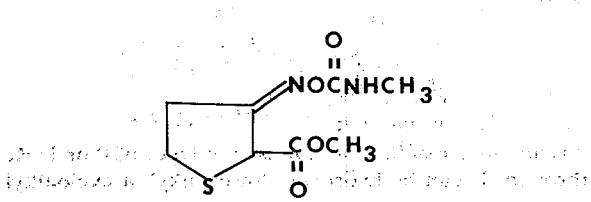

3,3-dimethyl-4-methylcarbamyloximinotetrahydrothiophene

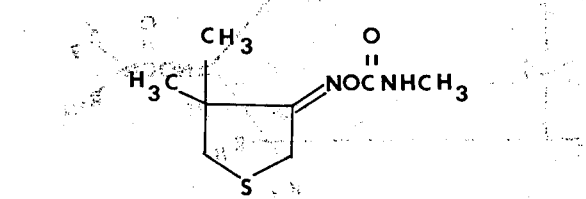

3,3-dimethyl-4-methylcarbamyloximinotetrahydrothiophene

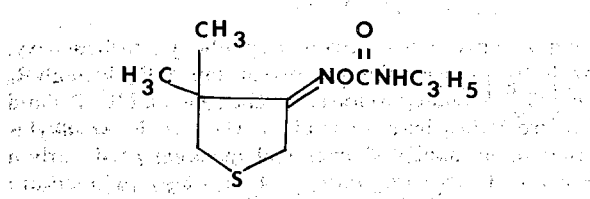

2,2-dimethyl-4-methylcarbamyloximinotetrahydrothiophene

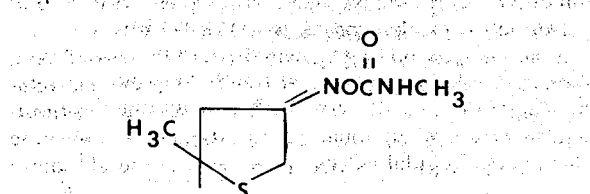

2,4,4-trimethyl-3-methylcarbamyloximinotetrahydrothiophene

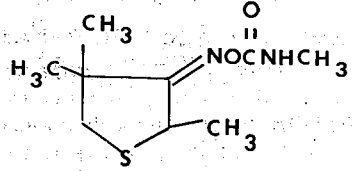

3-methylcarbamyloximinotetrahydrothiapyran

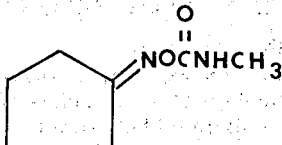

3,3-diethyl-4-methylcarbamyloximinotetrahydrothiophene

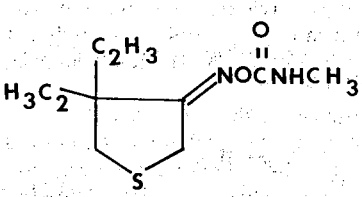

3-ethyl-3-methyl-4-methylcarbamyloximinotetrahydrothiophene

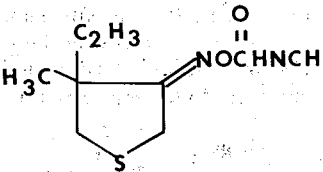

4-methylcarbamyloximino-2-thiaspiro[4,5]decane

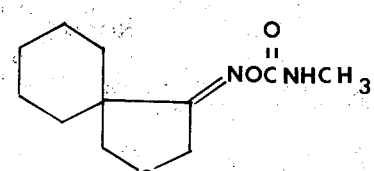

4-methylcarbamyloximino-2-thiaspiro[4,5]dec-7-one

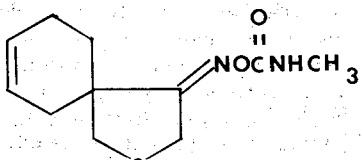

2,3,3-trimethyl-4-methylcarbamyloyiminotetrahydrothiophene

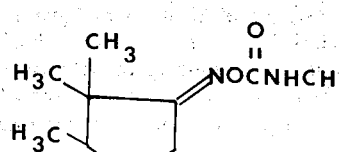

2-n-propyl-3,3-dimethyl-4-methylcarbamylox-
iminotetrahydrothiophene

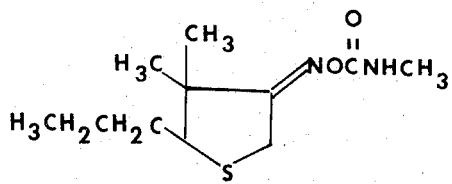

2-iso-propyl-3,3-dimethyl-4-methylcarbamylox-
iminotetrahydrothiophene

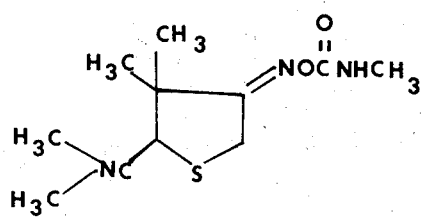

3-methyl-3-methylthio-4-methylcarbamyloximinoto-
trahydrothiophene

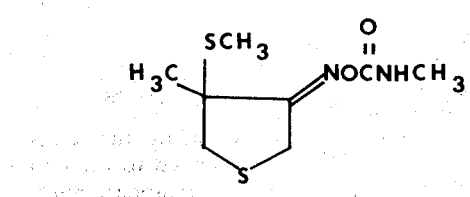

3-methyl-3-ethylthio-4-methylcarbamyloximinotet-
rahydrothiophene

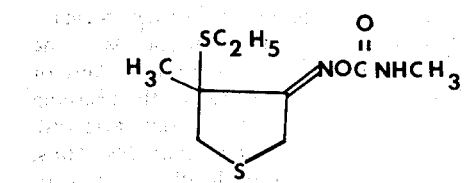

3,3-dimethyl-4-methylcarbamyloximinotetrahydro-
thiophene 1-oxide

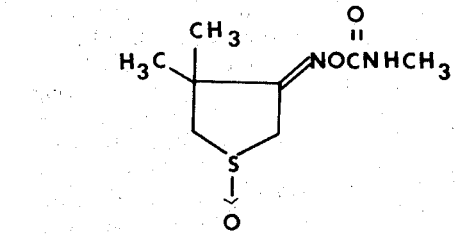

3,3-dimethyl-4-methylcarbamyloximinotetrahydro-
thiophene 1,1-dioxide

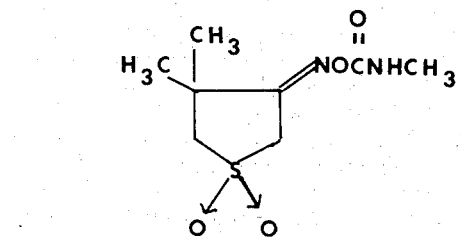

3-methylcarbamyloximinotetrahydrothiophene 1,1-
dioxide

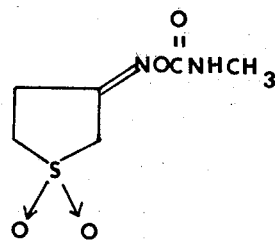

3,3-dimethyl-4-methylcarbamyloximinotetrahy-
drofuran

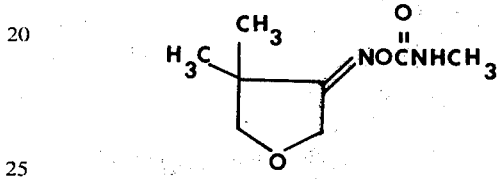

3-methyl-3-methylthio-4-methylcarbamylox-
iminotetrahydrofuran

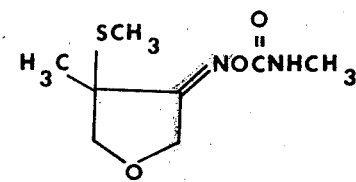

3-methylcarbamyloximinotetrahydrothiapyran 1-
oxide

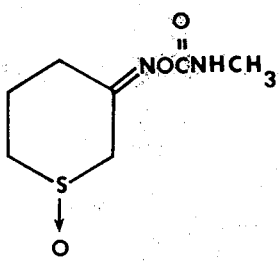

3-methylcarbamyloximino-4,4-dimethyltetrahydro-
thiapyran

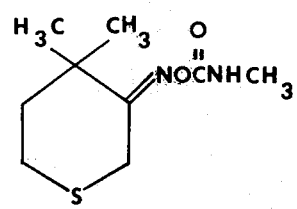

3-methylcarbamyloximino-4,4-dimethyltetrahydro-
thiapyran 1-oxide

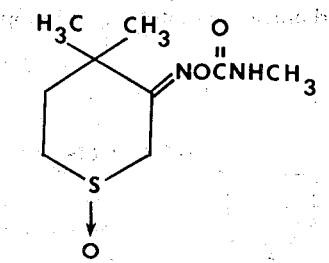

3-methylcarbamyloximino-4,4-dimethyltetrahydrothiapyran 1,1-dioxide

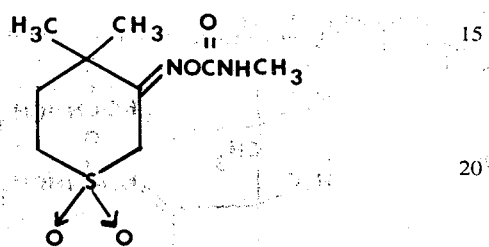

3,3-dimethyl-4-allylcarbamyloximinotetrahydrothiophene

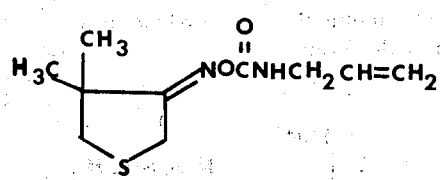

2,4,4-trimethyl-3-allylcarbamyloximinotetrahydrothiophene

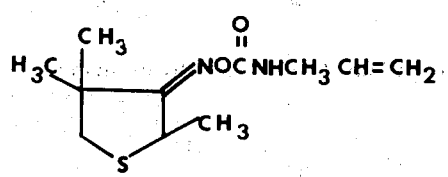

4-methyl-3-methylcarbamyloximinotetrahydrothiophene

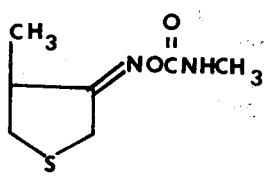

4-methyl-3-methylcarbamyloximinotetrahydrothiapyran

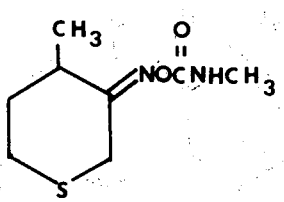

Pesticidally active intermediates to certain of the foregoing compounds include:

2,4,4-trimethyltetrahydrothiophen-3-one oxime

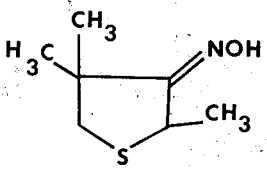

2,2-dimethyl-3-carbethoxytetrahydrothiophen-4-one

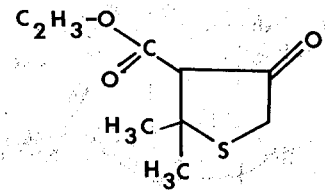

2,2-dimethyltetrahydrothiophen-4-one

APPLICATION OF THE COMPOUNDS

As used in this specification and claims, the terms "pesticide" and "pesticidal" are intended to refer to the killing and/or control of insects, nematodes, mites, organisms on plants, microorganisms, or the like. Thus, it will be appreciated that applications commonly termed nematocidal, insecticidal, miticidal, or the like are contemplated in the employment of these terms.

While it is possible to apply the compounds of the present invention in undiluted form to the plant or other material to be protected, it is frequently desirable to apply the novel N-alkylcarbamates in admixture with either solid or liquid inert, pesticidal adjuvants. Thus, these compounds can be applied to the plants for pesticidal purposes, for example, by spraying the plants with aqueous or organic solvent dispersions of the compounds of this invention. The choice of an appropriate solvent is determined largely by the concentration of active ingredient which it is desired to employ, by the volatility required in a solvent, the cost of the solvent, and the nature of the material being treated. Among the many suitable solvents which can be employed as carriers for the present pesticides, there may be mentioned hydrocarbons such as benzene, toluene, xylene, kerosene, diesel oil, fuel oil, petroleum, naphtha; ketones such as acetone, methyl ethyl ketone and cyclohexanone; chlorinated hydrocarbons such as carbon tetrachloride, chloroform, trichloroethylene, perchlorethylene, esters such as ethyl acetate, amyl acetate and butyl acetate; the monoalkyl ethers of ethylene glycol, e.g., the monomethyl ethers; and the monoalkyl ethers of diethylene glycol, e.g., the monoethyl ether; alcohols such as ethanol, isopropanol and amyl alcohol, etc.

The compounds of this invention can also be applied to plants and other materials along with inert solid adjuvants or carriers such as talc, pyrophyllite, Attaclay, kieselguhr, chalk, diatomaceous earth, calcium carbonate, bentonite, fuller's earth, cottonseed hulls, wheat flour, soybean flour, etc., pumice, tripoli, wood flour, walnut shell flour and lignin.

It is frequently desirable to incorporate a surface active agent in the pesticidal compositions of this invention. Such surface active agents are advantageously employed in both the solid and liquid compositions. The surface active agent can be anionic, cationic or nonionic in character. Typical classes of surface active agents include alkyl sulfonates, alkylaryl sulfonates, alkyl sulfates, alkylamide sulfonates, alkylaryl polyether alcohols, fatty acid esters of polyhydric alcohols, ethylene oxide addition products of such esters; addition products of long-chain mercaptans and ethylene oxide; sodium alkyl benzene sulfonates having 14 to 18 carbon atoms, alkylphenolethylene oxides, e.g., p-isooctyl phenol condensed with ethylene oxide units; and soaps, e.g., sodium stearate and sodium oleate.

The solid and liquid formulations can be prepared by any suitable method. Thus, the active ingredients, in finely divided form if a solid, may be tumbled together with a finely divided solid carrier. Alternatively, the active ingredient in liquid form, including solutions, dispersions, emulsions, and suspensions thereof, may be admixed with the solid carrier in finely divided form in amounts small enough to preserve the free-flowing property of the final dust compositions.

When solid compositions are employed, in order to obtain a high degree of coverage with a minimum dosage of the formulation, it is desirable that the formulation be in finely divided form. The dust containing active ingredient usually should be sufficiently fine that substantially all will pass through a 20-mesh Tyler sieve. A dust which passes through a 200-mesh Tyler sieve also is satisfactory.

For dusting purposes, preferably formulations are employed in which the active ingredient is present in an amount of 5 to 50 percent of the total by weight. However, concentrations outside this range are operative and compositions containing from 1 to 99 percent of active ingredient by weight are contemplated, the remainder being carrier and/or any other additive or adjuvant material which may be desired. It is often advantageous to add small percentages of surface active agents, e.g., 0.5 to 1 percent of the total composition by weight, to dust formulations, such as the surface active agents previously set forth.

For spray application, the active ingredient may be dissolved or dispersed in a liquid carrier, such as water or other suitable liquid. The active ingredient can be in the form of a solution, suspension, dispersion or emulsion in aqueous or nonaqueous medium. Desirably, 0.5 to 1.0 percent of a surface active agent, by weight, is included in the liquid composition.

For adjuvant purposes, any desired quantity of surface active agent may be employed, such as up to 250 percent of the active ingredient by weight. If the surface active agent is used only to impart wetting qualities, for example, to the spray solution, as little as 0.05 percent, or less of the spray solution need be employed. The use of larger amounts of surface active agent is not based upon wetting properties but is a function of the physiological behavior of the surface active agent. These considerations are particularly applicable in the case of the treatment of plants. In liquid formulations, the active ingredient often constitutes not over 30 percent, by weight, of the total and may be 10 percent, or even as low as 0.01 percent.

For systemic use of the compounds of this invention, it is often desirable to apply the pesticide to the soil in the form of granules of an inert material coated with or incorporating the active ingredient. The reasons for the use of such granules include elimination of water during application, reduction of drift, penetration through vegetative coverage, easy handling, storage, and increased safety to handlers of the pesticides. Among frequently used granule carrier materials are attapulgite, montmorillonite, corn cobs, walnut shells, and expanded vermiculites. Depending on their physical properties, the toxicants are either directly sprayed on the preformed granular base or are dissolved in a suitable solvent and then sprayed onto the granular base after which the solvent is removed by evaporation. The granule base materials are usually 60 to 14 U.S. sieve size particles, although it will be appreciated that other size particles may also be employed.

PREPARATION OF DISCLOSED COMPOUNDS

The compounds of the foregoing general structure where one of $R_9$ and $R_{10}$ is hydrogen and the other is an alkyl group may be synthesized (1) by the reaction of a lower alkyl isocyanate with the appropriate oxime precursor or (2) by the reaction of the appropriate oxime precursor with phosgene followed by treatment of the resulting chloroformate intermediate with the appropriate primary amine to yield the desired compound of the foregoing general structure. The compounds of the foregoing general structure where $R_9$ and $R_{10}$ are not hydrogen can be synthesized by (1) the reaction of the appropriate oxime with phosgene followed by treatment of the resulting chloroformate intermediate with the appropriate secondary amine or (2) by reacting the oxime precursor with an appropriate carbamyl halide to yield the desired compound of the foregoing general structure.

The oximes employed in the foregoing reactions are prepared from their cyclic ketone precursors by standard methods of reacting the ketone with hydroxylamine. The ketones are prepared by Dieckmann condensations or by pyrolysis of the barium salt of the appropriate aliphatic diacid.

Broadly the foregoing reactions can be characterized as a method for the preparation of a composition of the structural formula:

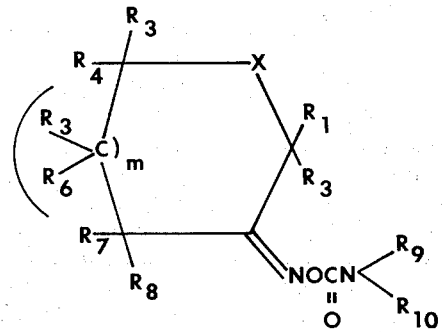

where X is -O-,

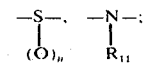

$n$ is an integer of 0, 1 or 2; $m$ is an integer of 0 or 1; $R_1$ through $R_8$ can be hydrogen, lower alkyl, a cycloalkyl ring, alkenyl, alkoxy, thioalkoxy, phonyl, and carboalkoxy with the provision that any two groups of $R_1$ through $R_8$ may be connected to form a cyclic ring and $R_9$, $R_{10}$ and $R_{11}$ are hydrogen or lower alkyl, having the step of reacting (a) a compound selected from the structure of:

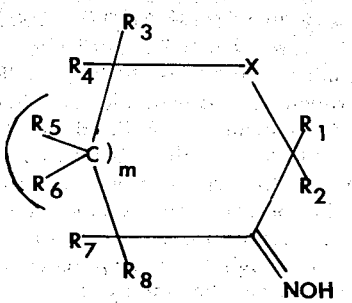

with $R_1$ through $R_8$, X, n and m being the same as previously stated, with (b) phosgene and (c) a primary or secondary amine with the order of reaction of the three reactants varying with the specific compound being synthesized.

In order that those skilled in the art may more completely understand the present invention and the preferred methods by which the same may be carried into effect, the following specific examples may be offered:

EXAMPLE 1

Preparation of 3-methylcarbamyl-oximinotetrahydrothiophene

Five g (0.043 m) of tetrahydrothiophen-3-one oxime whose preparation is reported in Helvetica Chimica Acta 27, 1285 (1944), is treated with 20 ml of methyl isocyanate. After the initial exothermic reaction has subsided, the mixture was heated at reflux for 5 hours, cooled, and stripped of volatiles to give 9.3 g of an amber liquid residue of 3-methylcarbamyloximinotetrahydrothiophene having a refractive index of $n_D^{25}$ 1.5528 and the following elemental analysis. Calculated for $C_6H_{10}N_2O_2S$: C, 41.4%; H, 5.8%. Found: C, 41.8%; H, 5.8%.

EXAMPLE 2

Preparation of 3-carbomethoxy-4-methylcarbamyloximinotetrahydrothiophene

A mixture of 5.3 g (0.03m) of 3-carbomethoxytetrahydrothiophen-4-one oxime prepared according to the method described in the Journal of Organic Chemistry 18, 138 (1953), and 25 ml of methyl isocyanate was heated at reflux for 5 hours and stripped of volatiles to give 8.5 g of dark brown viscous liquid of 3-carbomethoxy-4-methyl-carbamyloximinotetrahydrothiophene with a foamy appearance as confirmed by the infrared spectrum and the following elemental analysis. Calculated for $C_8H_{12}N_2O_4S$: C, 41.4%; H, 5.2%. Found: C, 41.5%; H, 4.8%.

EXAMPLE 3

Preparation of 2-carbomethoxy-3-methylcarbamyloximinotetrahydrothiophene

This compound is prepared in two steps starting with the use of 2-carbomethoxytetrahydrothiophen-3-one.

A solution of 20 g (0.125m) of 2-carbomethoxytetrahydrothiophen-3-one and 20 g (0.288 m) of hydroxylamine hydrochloride in 300 ml of methanol was treated with 22.9 g (0.29 m) of pyridine and heated under reflux for 16 hours. The residue after stripping of the solvent was partitioned between ethyl acetate and water and the organic layer dried and stripped to give 14.3 g of a dark brown liquid residue of 2-carbomethoxytetrahydrothiophen-3-one oxime with the following elemental analysis. Calculated for $C_6H_9NO_3S$: C, 41.1%; H, 5.2%. Found: C, 40.7%, H, 5.4%. Infrared analysis confirmed the assigned structure.

A solution of 5.3 g (0.03 m) of 2-carbomethoxytetrahydrothiophen-3-one oxime and 25 ml of methyl isocyanate ($CH_3NCO$) was heated under reflux for 5 hours, then stripped of volatiles to give 9.0 g of dark brown, viscous liquid of 2-carbomethoxy-3-methylcarbamyloximinotetrahydrothiophene as confirmed by the infrared spectrum.

EXAMPLE 4

Preparation of 3,3-dimethyl-4-methylcarbamyloximinotetrahydrothiophene

A solution of 32.6 g (0.25 m) of 3,3-dimethyltetrahydrothiophen-4-one, prepared as described in the Journal of the Chemical Society 650 (1961), 34.8 g. (0.5 m) of hydroxylamine hydrochloride and 68 g (0.5 m) of sodium acetate trihydrate in 200 ml of ethanol and 100 ml of water was heated under reflux for 4 hours. The volume was reduced on a rotary evaporator and the residue partitioned between ethyl acetate and water. The ethyl acetate solution was washed with aqueous sodium bicarbonate, dried, and stripped to give 26 g of pink solid of 3,3-dimethyltetrahydrothiophen-4-one oxime, melting at 53°–54° C. The infrared spectrum was consistent with the proposed structure.

A mixture of 14.5 g (0.1 m) of 3,3-dimethyltetrahydrothiophen-4-one oxime, 7 ml of methyl isocyanate, three drops of triethylamine and 50 ml of ether was heated under reflux for 3.5 hours and allowed to stand overnight. Stripping of volatiles gave 20.7 g of tan solid which infrared analysis indicated to contain some starting material. This was retreated with 7 ml of methyl isocyanate, three drops of triethylamine and 50 ml of ether for 3 hours. Stripping of volatiles gave 20 g of yellow-tan solid of 3,3-dimethyl-4-methylcarbamyloximinotetrahydrothiophene, melting at 64°–66° C with the following elemental analysis. Calculated for $C_8H_{14}N_2O_2 S$: N, 13.9%; S, 15.9%. Found: N, 14,2%; S, 15.2%. The infrared spectrum was consistent with the assigned structure.

EXAMPLE 5

Preparation of 3,3-dimethyl-4-allylcarbamyloximinotetrahydrothiophene

A solution of 7.3 g (0.05 m) of 3,3-dimethyltetrahydrothiophen-4-one oxime, 4.1 g (0.05 m) of allyl isocyanate, 3 drops of triethylamine, and 100 ml anhydrous ether was heated under reflux for 16 hours and stripped of volatiles on a rotary evaporator to give 11.5 g (100%) of viscous, yellow oil, $n_D^{25}$ 1.5276.

EXAMPLE 6

Preparation of
3,3-dimethyl-4-ethylcarbamyloximinotetrahydrothiophene

A mixture of 7.3 g (0.05 m) of 3,3-dimethyltetrahydrothiophen-4-one oxime, prepared by the procedure described in Example 4, 3.9 g (0.05 m) of ethyl isocyanate, 3 drops of triethylamine as the catalyst, and about 60 ml of anhydrous ether was heated under reflux for 24 hours, cooled, and stripped on the rotary evaporator. A white solid residue, 9.5 g, m.p. 92°–94° C (which softened at 87° C), was obtained. This solid was 3,3-dimethyl-4-ethylcarbamyloximinotetrahydrothiophene, the desired product, as indicated by its infrared spectrum.

EXAMPLE 7

Preparation of
4-methyl-3-methylcarbamyloximinotetrahydrothiophene

To a 500 ml, 3-neck flask equipped with a condenser and heating mantle were added 23.2 g (0.2 m) of 4-methyltetrahydrothiophen-3-one prepared as described in Svensk Kemisk Tidskrift 57, 24 (1945), 172 ml of 95percent ethanol, 27.8 g (0.4 m) of hydroxylamine hydrochloride in 45 ml of water, and 20.1 g (0.19 m) of anhydrous sodium carbonate in 45 ml of water. The solution was heated at reflux for 6.5 hours, then stripped of ethanol through a rotary evaporator. The two-layer residue was extracted three times with ethyl acetate. After being dried over anhydrous magnesium sulfate, the solution was stripped through the rotary evaporator to give 24.6 g of orange-tinted, white damp solid, the infrared spectrum of which was in agreement with the desired structure, 4-methyltetrahydrothiophen-3-one.

To a dried 200 ml flask equipped with a condenser with drying tube and heating mantle were added 10.5 g (0.08 m) of 4-methyl-3-ketotetrahydrothiophene oxime, 100 ml of anhydrous ether, 5 g (0.088 m) of methyl isocyanate and 4 drops of triethylamine. The pale yellow solution was heated at reflux for 6 hours and then stripped through a rotary evaporator. There was collected 5.8 g of amber viscous liquid which was dissolved in 50 ml of ahydrous ether and treated with 2.6 g (0.046 m) of methyl isocyanate and 3 drops of triethylamine. The reaction mixture was heated at reflux for 24 hours and stripped through a rotary evaporator to give 6.2 g of viscous amber liquid which was 4-methyl-3-methylcarbamyloximinotetrahydrothiophene, as indicated by its infrared spectrum.

EXAMPLE 8

Preparation of
2,2-dimethyl-4-methylcarbamyloximinotetrahydrothiophene

To a suspension of sodium ethoxide in benzene, prepared from 64 g (1.5 m) of 56.2 percent sodium hydride emulsion, 69 g (1.5 m) of absolute ethanol and 300 ml of benzene, was added over 20 minutes at or near reflux, 162 g (1.35 m) of ethyl 2-mercaptoacetate in 100 ml of benzene. The resulting slurry was treated over 25 minutes with a solution of 179 g (1.4 m) of ethyl 3,3-dimethylacrylate in 50 ml of benzene and then heated under reflux for 1.25 hours. The brown reaction mixture was extracted with four portions of ice water. The combined aqueous extracts were immediately acidified with cold, concentrated HCl and extracted with three portions of benzene. Distillation of the dried benzene layer gave 198 g of a yellow liquid, 2,2-dimethyl-3-carbethoxytetrahydrothiophen-4-one, in three cuts having refractive indices of $n_D^{25}$ 1.4850 to 1.4874, and distilling at 69°/0.08 mm to 77°/0.55 mm. The infrared spectra were consistent with the proposed structure.

A mixture of 151.7g (0.75 m) of 2,2-dimethyl-3-carbethoxytetrahydrothiophen-4-one, 200 cc of acetic acid, 105 cc of concentrated sulfuric acid and 750 cc of water was stirred and heated under reflux for 8 hours. The mixture was cooled, extracted with two portions of benzene, and the benzene extract washed with 10% aqueous caustic and dried over anhydrous magnesium sulfate. The filtered solution was stripped and distilled through a 1 inch × 6 inch Vigreaux column to give 79 g of colorless liquid, 2,2-dimethyltetrahydrothiophen-4-one, in two cuts with refractive indices $n_D^{25}$ 1.4926 to 1.4929. The infrared spectrum was consistent with the assigned structure.

A solution of 32.6 g (0.25 m) of 2,2-dimethyltetrahydrothiophen-4-one, 34.8 g (0.5 m) of hydroxylamine hydrochloride and 68 g (0.5 m) of sodium acetate trihydrate in 200 ml of 95 percent ethanol and 110 ml of water was heated under reflux for 6 hours. The volume was reduced by distillation at reduced pressure, and the residue was partitioned between ethyl acetate and water. The ethyl acetate layer was washed with aqueous sodium bicarbonate, dried anad stripped to give 33.5 g of a clear, orange-red liquid of 2,2-dimethyltetrahydrothiophen-4-one oxime having a refractive index $n_D^{25}$ 1.5292. The assigned structure was supported by the infrared spectrum.

A solution of 14.5 g (0.1 m) of 2,2-dimethyltetrahydrothiophen-4-one oxime, 10 ml of methyl isocyanate and 60 ml of benzene was treated with three drops of triethylamine. An exothermic reaction occurred after which the reaction mixture was heated under reflux for 5 hours and stripped on a rotary evaporator to give 23 g of a dark, red-brown viscous fluid, 2,2-dimethyl-4-methylcarbamyloximinotetrahydrothiophene. The infrared spectrum was consistent with the assigned structure.

EXAMPLE 9

Preparation of
2,4,4-trimetyl-3-methylcarbamyloximinotetrahydrothiophene

The 2,4,4-trimethyltetrahydrothiopen-3-one oxime was prepared from a solution of 21.6 g (0.15 m) of 2,4,4-trimethyltetrahydrothiophen-3-one, whose preparation is described in the Journal of the Chemical Society 650 (1961), 20.9 g (0.3 m) of hydroxylamine hydrochloride and 24.6 g (0.3 m) of sodium acetate trihydrate in 200 ml of 95 percent ethanol and 110 ml of water which was heated under reflux for 4 hours and stripped on the rotary evaporator to give a white slurry which was filtered, washed with water, and dried in a vacuum disiccator over sodium hydroxide to give 19.5 g of a white solid melting at 81°–83° C. The infrared spectrum was consistent with the proposed structure.

A solution of 9.6 g (0.06 m) of 2,4,4-trimethyltetrahydrothiophen-3-one oxime, 5 ml of methyl isocyanate, and four drops of triethylamine in 150 ml of ether was heated under reflux for 6 hours, allowed to stand and stripped on the rotary evaporator to give 12.5 g of a cloudy liquid which became a pasty solid on standing. This compound was identified by its infrared spectrum as 2,4,4-trimethyl-3-methylcarbamyloximinotetrahydrothiophene melting at 73°–76° C.

EXAMPLE 10

Preparation of 2,4,4-trimethyl-3-allylcarbamyloximinotetrahydrothiophene

A solution of 4.0 g (0.025 m) of 2,4,4-trimethyltetrahydrothiophen-3-one oxime, prepared as described in Example 9, 2 g (0.025 m) of allyl isocyanate, 3 drops of triethylamine and 40 ml of anhydrous ethyl ether was heated for 5.5 hours under reflux, then stripped by means of a rotary evaporator to give 6.0 g (100 percent) clear yellow oil $n_D^{26}$ 1.5242. The infrared spectrum was consistent with the assigned structure.

EXAMPLE 11

Preparation of 3-ethyl-3-methyl-4-methylcarbamyloximinotetrahydrothiophene

Solutions of (1) 132 g (0.68 m) of 2-bromomethyl-2-methylbutyric acid, whose preparation is described in French Patent 1,231,163, in 350 ml of 95 percent ethanol and 980 ml of water and (2) 28 g (0.7 m) of sodium hydroxide in 265 ml of water were added over two hours to a solution of 69 g (0.75 m) of mercaptoacetic acid in 400 ml of water containing 66 g of sodium hydroxide at a rate such that two parts of solution (1) were added for each part of solution (2). For 45 minutes, the addition was conducted at ambient temperature and the remainder of the time under reflux conditions. The resulting mixture was heated under reflux for 6 hours, left overnight, stripped of the ethanol and the residue poured onto ice and hydrochloric acid. The acid mixture was extracted with four portions of ether which were combined, and the combination was extracted with four portions of 10 percent aqueous sodium carbonate. Acidification of the carbonate solution followed by extraction with ether, drying and stripping gave 79 g of light yellow viscous liquid whose infrared spectrum was consistent with the assigned structure of 2-ethyl-2-methyl-4-thiaadipic acid.

A mixture of 79 g (0.38 m) of 2-ethyl-2-methyl-4-thiaadipic acid and 3.0 g of barium hydroxide was added to a 100 ml, three-necked flask equipped with a mechanical stirrer, thermometer, distilling head, condenser and receiving flask. The stirred mixture was heated in a Wood's metal bath at a 200°–310°C bath temperature until distillation was complete. The organic layer was separated from the water layer with the aid of ether. The ether solution was dried over magnesium sulfate, filtered, and stripped. The residue was distilled through a 5 inch × ⅝ inch Vigreux column and Claisen head with the following fractions of 3-ethyl-3-methyltetrahydrothiophen-4-one being collected after a small forerun:

Cut No. 1: bp 81.5°/9 mm, 5.5 g yellow liquid, $n_D^{23.5}$ = 1.4967

Cut No. 2: bp 80°–81.5°/9.9 mm, 5.5 g yellow liquid, $n_D^{25}$ = 1.4960

Cut No. 3: bp 81.5°/9.5 mm, 3.0 g near-colorless liquid, $n_D^{25}$ = 1.4975

The proposed structure was supported by the infrared spectra.

A solution of 28.0 g (0.2 m) of 3-ethyl-3-methyltetrahydrothiophen-4-one in 172 ml of 95 percent ethanol, 27.8 g (0.4 m) of hydroxylamine hydrochloride in 45 ml of water, and 21.2 g (0.2 m) of sodium carbonate in 45 ml of water was heated in a 500 ml flask at reflux for 6 hours. The clear light yellow solution was stripped of ethanol by means of rotary evaporator at water aspirator pressure. The resulting two-layered residue was taken up in ethyl acetate and the dried organic layer stripped to give 29.5 g of amber, somewhat viscous liquid having a refractive index of $n_D^{27}$ 1.5290. The infrared spectrum was consistent with the proposed structure of 3-ethyl-3-methyltetrahydrothiophen-4-one oxime.

A solution of 11.2 g (0.07 m) of 3-ethyl-3-methyltetrahydrothiophen-4-one oxime, 50 ml of anhydrous ether, 4.4 g (0.077 m) of methyl isocyanate and 4 drops of triethylamine was charged to a dried 100 ml flask equipped with a condenser with drying tube. The solution was heated at reflux for 6 hours, then stripped by means of a rotary evaporator at reduced pressure to give 14.7 g of an amber viscous liquid of 3-ethyl-3-methyl-4-methylcarbamyloximinotetrahydrothiophene of refractive index $n_D^{26}$ 1.5282. The infrared spectrum was consistent with the proposed structure.

EXAMPLE 12

Preparation of 3,3-diethyl-4-methylcarbamyloximinotetrahydrothiophene

To a solution of 42.4 grams (0.6 m) of sodium carbonate in 450 ml of water was added 160 g (0.77 m) of 2-bromomethyl-2-ethylbutyric acid, whose preparation is described in French Pat. No. 1,231,163. A water insoluble upper layer formed. This mixture was added to a solution of 78.3 g (0.85 m) of mercaptoacetic acid in 175 ml of water containing 52.2 g of potassium hydroxide. The resulting mixture was stirred and heated under reflux for 13.5 hours, cooled, and poured onto ice and hydrochloric acid. The ether extract of this mixture was in turn extracted with saturated aqueous sodium bicarbonate. Acidification of the basic solution followed by extraction with ether, drying, and stripping gave 68 g of nearly colorless viscous liquid whose infrared spectrum was compatible with the assigned structure of 2,2-diethyl-4-thiaadipic acid.

A mixture of 67 g (0.3 m) of 2,2-diethyl-4-thiaadipic acid and 2.1 g of barium hydroxide in a simple distillation apparatus was heated with a Wood's metal bath at 220°–240° C pot temperature until distillation ceased. The water layer (4.5 g) was separated from the distillate (33.9 g) and the dried organic layer distilled to give 11.4 g of distillate in two cuts, bp 93°–97°/7.3–9 mm, with refractive indices of $n_D^{25}$ 1.4965 to $n_D^{24}$ 1.4994. The infrared spectra were consistent with the assigned structure of 3,3-diethyltetrahydrothiophen-4-one.

A solution of 11.0 g (0.07 m) of 3,3-diethyltetrahydrothiophen-4-one in 60 ml of 95 percent ethanol, 9.8 g (0.14 m) of hydroxylamine hydrochloride in 15 ml of water and 7.4 g (0.07 m) of sodium carbonate in 16 ml of water was charged into a 200 ml single-necked flask equipped with a condenser and heating mantle. After being heated at reflux for 15.5 hours, the clear yellow solution was stripped of ethanol through a rotary evaporator at aspirator pressure and the residue suction filtered. The yellow solids were dried in a vacuum desiccator over Drierite to give 10.4 g of yellow solids melting at 69°–75° C. The infrared spectrum was consistent with the proposed structure of 3,3-diethyltetrahydrothiophen-4-one oxime.

A solution of 7 g (0.04 m) of 3,3-diethyltetrahydrothiophen-4-one oxime, 50 ml of anhydrous ether, 2.5 g (0.044 m) of methyl isocyanate and 4 drops of triethylamine was charged to a dried 100 ml flask equipped with a condenser with drying tube and heated with an oil bath at reflux temperature for 6 hours. This mixture was stripped through a rotary evaporator at reduced pressure to give 8.5 g of light amber viscous liquid having a refractive index of $n_D^{26.5}$ 1.5252. The infrared spectrum of the resulting liquid was consistent with its proposed structure of 3,3-diethyl-4-methylcarbamyloximinotetrahydrothiophene.

EXAMPLE 13

Preparation of
3-methyl-3-methylthio-4-methylcarbamyloximinotetrahydrothiophene

To a cooled, stirred solution of 131 g (1.3 m) of methyl methacrylate in 400 ml of anhydrous ether was added, over 1 hour at 0°–5° C, 108.7 g (1.3 m) of methanesulfenyl chloride in 330 ml of anhydrous ether. The resulting solution was stirred at 0°–5° C for an additional hour, stripped of solvent and distilled through a 1 inch × 7 inch Vigreux column to give 186 g (83 percent) of pale yellow liquid in two cuts, bp 76°–77°/5-.3–5.5 mm, $n_D^{24}$ 1.4850 and bp 76°–77°/5.1–5.3 mm, $n_D^{26}$ 1.4850. The infrared spectrum was consistent with the proposed structure of methyl 3-chloro-2-methyl-2-methylthiopropionate.

To a solution of sodium methoxide prepared from 16.1 g (0.7 m) of sodium and 600 ml of anhydrous methanol was added 74.3 g (0.7 m) of methyl thioglycolate, a trace of sodium iodide and 128 g (0.7 m) of methyl 3-chloro-2-methyl-2-methylthiopropionate. The entire operation was carried out under an atmosphere of nitrogen. After being heated at reflux for 4 hours, the reaction mixture was filtered and the filtrate stripped of methanol under reduced pressure. A chloroform solution of the residue was washed with water, dried and stripped of solvent to give 123 g (70 percent) of amber liquid $n_D^{25}$ 1.4963 whose infrared spectrum was in agreement with the proposed structure of dimethyl 2-methyl-2-methylthio-4-thiaadipate.

To a slurry of sodium methoxide prepared from 16.6 g (0.52 m) of methanol, 22.3 g (0.52 m) of 56.2 percent sodium hydride dispersion and 1100 ml of anhydrous toluene was added a solution of 118.5 g (0.47 m) of dimethyl 2-methyl-2-methylthio-4-thiaadipate in 200 ml of toluene over 30 minutes at 37°–42° C. The resulting mixture was heated at 48°–52° C for 5 hours, cooled and poured onto a mixture of ice and hydrochloric acid. The organic layer was combined with the ether extract of the aqueous portion, dried, stripped of solvent and distilled to give 52 g (50 percent) of yellow liquid in four cuts, bp 70°–82°/0.9 mm, $n_D^{25}$ 1.5009–1.5035. The infrared spectrum was consistent with the assigned structure of 2-carbomethoxy-4-methyl-4-methylthiotetrahydrothiophen-3-one.

A stirred mixture of 48 g (0.22 m) of 2-carbomethoxy-4-methyl-4-methylthiotetrahydrothiophen-3-one and 384 ml of 10 percent aqueous sulfuric acid was heated at reflux for 4 hours. The ether extract of the reaction mixture was dried, stripped of solvent and distilled to give 21 g (43 percent) of colorless to yellow liquid, bp 70°/9.1 mm, $n_D^{25}$ 1.5080. The infrared spectrum was consistent with the assigned structure of 3-methyl-3-methylthiotetrahydrothiophen-4-one.

A solution of 11.7 g (0.072 m) of 3-methyl-3-methylthiotetrahydrothiophen-4-one, 10 g (0.14 m) of hydroxylamine hydrochloride, and 7.6 g (0.072 m) of sodium carbonate in 62 ml of ethanol and 32 ml of water was heated at reflux for 5.5 hours and stripped of solvent. An ethyl acetate solution of the residue was washed with water, dried and stripped to give 12.2 g of dark brown solid which melted around 40°–50° C. The infrared spectrum was consistent with the proposed structure of 3-methyl-3-methylthiotetrahydrothiophen-4-one oxime.

To a dried 100 ml, 1-neck flask equipped with a condenser, drying tube and heating mantle were added 5.3 g (0.03 m) of 3-methyl-3-methylthiotetrahydrothiophen-4-one oxime, 50 ml of anhydrous ether, 1.9 g (0.033 m) of methyl isocyanate and 3 drops of triethylamine as a catalyst. The mixture was heated at reflux for 6 hours, then stripped through a rotary evaporator at reduced pressure to give 7.6 g of dark amber, very viscous liquid, 3-methyl-3-methylthio-4-methylcarbamyloximinotetrahydrothiophene, the desired product. The infrared spectrum was consistent with the structure.

EXAMPLE 14

Preparation of
3-methylcarbamyloximinotetrahydrothiapyran

A solution of 7.9 g (0.06 m) of tetrahydro-3-thiapyrone oxime, prepared as described in the Journal of the American Chemical Society 74, 917 (1952), 5 ml of methyl isocyanate, 3 drops of triethylamine and 50 ml of anhydrous ether was heated under reflux for 3 hours, left overnight, and stripped of volatiles on the rotary evaporator to give 12.5 g of yellow, viscous, cloudy liquid having a refractive index $n_D^{25}$ 1.5495. The infrared spectrum was consistent with the assigned structure.

EXAMPLE 15

Preparation of
4,4-dimethyl-3-methylcarbamyloximinotetrahydrothiapyran

To a solution of 14.4 g (0.1 m) of 4,4-dimethyltetrahydrothiapyran-3-one, prepared by the procedure described in Tetrahedron, 22, 285 (1966), in 100 ml of 95 percent ethanol, was added a solution of 14 g (0.2 m) of hydroxylamine hydrochloride in 35 ml of water followed by a solution of 10.6 g (0.1 m) of sodium carbonate in 35 ml of water. A white solid, which was 4,4-dimethyltetrahydrothiapyran-3-one oxime, separated immediately. This was filtered, washed thoroughly with water, and air dried to give 12.5 g of white solid, mp 147°–149° C. An additional 2.4 g was recovered from the filtrate, mp 145°–147° C. The infrared spectrum of the white solid indicated the absence of a —CO group and the presence of —OH and -C=N- groups.

A solution of 4.8 g (0.03 m) of 4,4-dimethyltetrahydrothiapyran-3-one oxime, 1.8 g (0.031 m) of methyl isocyanate, 3 drops of triethylamine and 200 ml of anhydrous ether was heated under reflux for 17 hours. Stripping on the rotary evaporator gave 6.6 g of clear liquid residue, the desired 4,4-dimethyl-3-methylcarbamyloximinotetrahydrothiapyran, which solidified to a white semi-solid on standing. The infrared spectrum was consistent with the proposed structure (-NH at 2.9μ and -C=O at 5.85μ).

EXAMPLE 16

Preparation of
3,3-dimethyl-4-methylcarbamyloximinotetrahydrofuran

A solution of 6.9 g (0.054 m) of 3,3-dimethyltetrahydrofuran-4-one oxime, prepared as described in Bulletin de la Societe Chimique de France 1909 (1967), 3.9 g (0.068 m) of methyl isocyanate, 4 drops of triethylamine, and 30 ml of anhydrous ethyl ether was heated under reflux for 6 hours and stripped by means of a rotary evaporator to give 10 g of colorless viscous liquid, $n_D^{25}$ 1.4740, whose infrared spectrum was consistent with the assigned structure.

UTILITY OF THE DISCLOSED COMPOUNDS

The following tests demonstrate the utility of the compounds of this invention in general in killing and/or control of pests and in particular the control of insects, acarids, bacteria, viruses, nematodes, and the like.

EXAMPLE 17

Bean Aphid Spray and Systemic Test

This test determines the insecticidal activity of the compound being tested against the bean aphid Aphis fabae. Stock formulations containing 500 ppm of each test chemical are prepared using 0.05 g of the test chemical (or 0.05 ml if a liquid), 4.0 ml acetone containing 0.25 percent (V/V Triton X-155, and 96.0 ml deionized water and are used in both soil drench and spray treatments. The stock formulations are diluted to obtain the appropriate lower concentrations maintaining the concentration level of all adjuvants. The bean aphid is cultured on nasturtium plants var. Tall Single, no attempt being made to select insects of a given age in these tests. Single nasturtium test plants growing in soil in individual 2¼ inch fiber pots are then infested with populations of 100 to 200 aphids.

In the spray application, 50 ml of the stock or diluted formulation is uniformly sprayed onto the plants. In the systemic application, 11.2 ml of stock or diluted formulation is applied to the soil containing the plant. A dosage of 11.2 ml of the formulation containing 500 ppm of test chemical is equivalent to a dosage of the test chemical of 16 pounds per acre.

A piece of moisture resistant thermoplastic heat sealable film, 4 inches × 4 inches is slit to the center, fitted around the base of the stem of the test plant in a fashion such as to form a shallow inverted cone and crimped in place. The pot-plant-film test units under fluorescent lights are given bottom watering for the duration of the test. Dead aphids fall onto the film where they can easily be counted. Percentage mortality is determined three days after treatment. Using this procedure, the results in Table 1 are obtained in the spray and systemic applications at the indicated concentrations with each test chemical:

TABLE 1

| Compound Tested | Spray Application Percent Mortality at Concentration in ppm | | | | Systemic Application Percent Mortality at Concentration in lb/acre | | | |
|---|---|---|---|---|---|---|---|---|
| | 250 | 128 | 64 | 32 | 8 | 4 | 2 | 1 |
| 3-methylcarbamyloximinotetrahydrothiophene | 100 | 100 | 100 | 91 | 100 | 100 | 100 | 70 |
| 3-carbomethoxy-4-methylcarbamyloximinotetrahydrothiophene | 100 | 100 | 100 | 0 | — | — | — | — |
| 3,3-dimethyl-4-methylcarbamyloximinotetrahydrothiophene | 100 | 100 | 100 | 100 | 100 | 76 | 81 | 25 |
| 2,2-dimethyl-4-methylcarbamyloximinotetrahydrothiophene | 100 | 100 | 100 | 87 | 100 | 78 | 38 | — |
| 3-methylcarbamyloximinotetrahydrothiapyran | 100 | 100 | 100 | 100 | 100 | 100 | 68 | 84 |
| 3,3-dimethyl-4-allylcarbamyloximinotetrahydrothiophene | 100 | 82 | 0 | — | — | — | — | — |
| 3,3-dimethyl-4-ethylcarbamyloximinotetrahydrothiophene | 100 | 100 | 93 | 90 | 100 | 43 | — | — |
| 2,4,4-trimethyl-3-methylcarbamyloximinotetrahydrothiophene | 100 | — | 100 | 100 | — | 100 | 100 | 16 |
| 3,3-dimethyl-4-methylcarbamyloximinotetrahydrofuran | 100 | 100 | — | 100 | 90 | 29 | — | — |
| 3-methyl-3-methylthio-4-methylcarbamyloximinotetrahydrothiophene | 100 | 100 | 100 | 85 | 100 | 83 | 63 | 43 |
| 4-methyl-3-methylcarbamyloximinotetrahydrothiophene | 100 | 100 | 100 | 66 | 100 | 100 | 78 | — |
| 4,4-dimethyl-3-methylcarbamyloximinotetrahydrothiapyran | 100 | 100 | 100 | 100 | 100 | 100 | 100 | 100 |
| 2,4,4-trimethyl-3-allylcarbamyloximinotetrahydrothiophene | 100 | 100 | 61 | — | 59 | 0 | — | — |

EXAMPLE 18

Bean Aphid Spray and Systemic Test - Residual Activity

This test determines the residual insecticidal activity of the compound being tested against the bean aphid Aphis fabae. The test procedure described in Example 17 above is followed with readings being made at 3 and at 7 days after spray and soil applications of diluted formulations of the chemical. Results of residual insecticidal activity tests are shown in Table 2:

TABLE 2

| Compound Tested | Concentration ppm | Spray Application Percent Mortality | | Concentration lbs/acre | Systemic Application Percent Mortality | |
|---|---|---|---|---|---|---|
| | | 3 days | 7 days | | 3 days | 7 days |
| 3,3-dimethyl-4-methylcarbamyl-oximinotetrahydrothiophene | 256 | 100 | 95 | 8 | 100 | 100 |
| | 128 | 100 | 60 | 4 | 76 | 47 |
| | 64 | 100 | 49 | 2 | 81 | 56 |

TABLE 2-continued

| Compound Tested | Concentration ppm | Spray Application Percent Mortality | | Concentration lbs/acre | Systemic Application Percent Mortality | |
|---|---|---|---|---|---|---|
| | | 3 days | 7 days | | 3 days | 7 days |
| | 32 | 100 | 41 | 1 | 25 | 46 |
| | 16 | 83 | 42 | | | |

EXAMPLE 19

Red Spider Mite Spray and Systemic Test

This test determines the acaricidal activity of the compound being tested against the red spider mite, Tetranychus sp. Stock formulations containing 500 ppm of each test chemical are prepared by the procedure described in Example 17 and are used in both the soil drench and spray treatments. The stock culture of mites is maintained on Scarlet runner bean foliage. Approximately 18 to 24 hours before testing, mites are transferred to the primary leaves of two Lima bean plants (var. Sieva) grown in 2¼-inch pots.

The spray and systemic application methods described in Example 17 above are used to apply the test formulations to the infested plants and soil. After three days, two of the four leaves treated are examined and mortality is determined. Should a compound be an effective miticide, the other two leaves are available to obtain information on the residual activity of the formulation. Using this procedure, the results shown in Table 3 are obtained:

EXAMPLE 20

Red Spider Mite Spray and Systemic Test - Residual Activity

This test determines the residual acaricidal activity of the compound being tested against the red spider mite, Tetranychus sp. The test procedure is the same as described in Example 19, except that readings are taken at three and at seven days after spray and soil applications of the diluted formulations of the chemical. Results of residual acaricidal activity tests are shown in Table 4 as follows:

TABLE 4

| Compound Tested | Concentration ppm | Spray Application Percent Mortality | | Concentration lbs/acre | Systemic Application Percent Mortality | |
|---|---|---|---|---|---|---|
| | | 3 days | 7 days | | 3 days | 7 days |
| 3,3-dimethyl-4-methylcarbamyl-oximinotetrahydrothiophene | 128 | 100 | 100 | 8 | 100 | 100 |
| | 64 | 100 | 89 | 4 | 100 | 100 |
| | 32 | 100 | 26 | 2 | 100 | 100 |
| | 16 | 98 | 11 | 1 | 43 | 39 |
| | 8 | 99 | 7 | | | |
| | 4 | 23 | 5 | | | |

EXAMPLE 21

Red Spider Mite Spray and Systemic Test - Different Strains

This test determines the acaricidal activity of the compound being tested against the red spider mite, Tetranychus sp., one strain being organophosphate resistant and another strain being organophosphate susceptible.

The test procedure is that described in Example 19, except that readings are taken at three and at seven days after spray and soil applications of the diluted formulations of the chemical. Results of these acaricidal activity tests are shown in Table 5:

TABLE 3

| Compound Tested | Spray Application Percent Mortality at Concentration in ppm | | | | Systemic Application Percent Mortality at Concentration in lb/acre | | | |
|---|---|---|---|---|---|---|---|---|
| | 500 | 250 | 128 | 64 | 8 | 4 | 2 | 1 |
| 3-methylcarbamyloximinotetrahydrothiophene | 100 | 15 | — | — | — | — | — | — |
| 3,3-dimethyl-4-methylcarbamyloximinotetrahydrothiophene | 100 | 100 | 100 | 100 | 100 | 100 | 100 | 43 |
| 2,2-dimethyl-4-methylcarbamyloximinotetrahydrothiophene | 100 | 100 | 0 | — | — | — | — | — |
| 3-methylcarbamyloximinotetrahydrothiapyran | 100 | 100 | 98 | 55 | — | — | — | — |
| 3,3-dimethyl-4-allylcarbamyloximinotetrahydrothiophene | 100 | 43 | — | — | — | — | — | — |
| 3,3-dimethyl-4-ethylcarbamyloximinotetrahydrothiophene | 100 | 73 | 78 | 0 | 99 | 0 | — | — |
| 3-ethyl-3-methyl-4-methylcarbamyloximinotetrahydrothiophene | 97 | 0 | — | — | — | — | — | — |
| 3-methyl-3-methylthio-4-methylcarbamyloximinotetrahydrothiophene | 97 | 85 | 0 | — | — | — | — | — |
| 4-methyl-3-methylcarbamyloximinotetrahydrothiophene | 97 | 81 | 11 | — | — | — | — | — |
| 4,4-dimethyl-3-methylcarbamyloximinotetrahydrothiapyran | — | 100 | 100 | 99 | 100 | 100 | 100 | 86 |
| 2,4,4-trimethyl-3-methylcarbamyloximinotetrahydrothiophene | — | 91 | 58 | — | — | — | — | — |

TABLE 5

| Compound Tested | Concentration ppm | Spray Application Percent Mortality | |
|---|---|---|---|
| | | Susceptible 3 days | Resistant 3 days |
| 3,3-dimethyl-4-methylcarbamyl-oximinotetrahydro-thiophene | 64 | 100 | 100 |
| | 16 | 99 | 100 |

| Concentration lbs/acre | Systemic Application Percent Mortality | | | |
|---|---|---|---|---|
| | Susceptible | | Resistant | |
| | 3 days | 7 days | 3 days | 7 days |
| 8 | 100 | 100 | 100 | 100 |
| 4 | 95 | 98 | 94 | 100 |
| 2 | 50 | 68 | 50 | 88 |
| 1 | 6 | 71 | 43 | 83 |

EXAMPLE 22

Housefly Spray Test

This test determines the insecticidal activity of the compound being tested against adult houseflies, Musca domestica.

Stock formulations containing 500 ppm of each test chemical are prepared using the procedure described in Example 17 above and are diluted to obtain the appropriate lower concentrations.

Ten adult flies are placed in a cylindrical screen cage 1½ by 4 inches fabricated from 20-mesh stainless steel screening and are sprayed with 50 ml of the stock or diluted formulation. The flies are suplied food and drink from a dextrose solution by draping a paper wick over the outside of the screen cylinder and are able to feed and drink ad libitum. Percent mortality obtained is determined three days after treatment. Results of these insecticidal activity tests are shown in Table 6:

EXAMPLE 23

Red-banded Leaf Roller Leaf Spray Test

This test determines the insecticidal activity of the compound being tested against the red-banded leaf roller, Argyrotaenia velutinana.

The test species is composed of newly hatched larvae of the red-banded leaf roller. Paired fully expanded primary leaves excised from Pinto bean plants are maintained in aquapics and sprayed with 50 ml of stock or diluted formulation in a turntable spray hood. This stock contains 1000 ppm of each test chemical and is prepared using the procedure of Example 17 except the amount of chemical is 0.1 g instead of 0.05 g. The stock formulations are diluted in the same manner to obtain the appropriate lower concentrations.

After the chemical deposit on the leaves is dry, the paired leaves are separated. One leaf is placed onto 1.5 percent water agar in a Petri dish. Ten newly hatched

TABLE 6

| Compound Tested | Percent Mortality at Concentration in ppm | | | | |
|---|---|---|---|---|---|
| | 500 | 250 | 128 | 64 | 32 |
| 3-methylcarbamyloximinotetrahydrothiophene | 100 | 100 | 100 | 100 | 90 |
| 3-carbomethoxy-4-methylcarbamyloximinotetrahydrothiophene | 100 | 30 | — | — | — |
| 3,3-dimethyl-4-methylcarbamyloximinotetrahydrothiophene | 100 | 100 | 100 | 100 | 100 |
| 2,2-dimethyl-4-methylcarbamyloximinotetrahydrothiophene | 90 | 70 | — | — | — |
| 3-methylcarbamyloximinotetrahydrothiopyran | 100 | 100 | 90 | 30 | — |
| 3,3-dimethyl-4-allylcarbamyloximinotetrahydrothiophene | 100 | 100 | 100 | 10 | — |
| 3,3-dimethyl-4-ethylcarbamyloximinotetrahydrothiophene | 100 | 100 | 100 | 100 | 60 |
| 3-ethyl-3-methyl-4-methylcarbamyloximinotetrahydrothiophene | 70 | 0 | — | — | — |
| 3-methyl-3-methylthio-4-methylcarbamyloximinotetrahydrothiophene | 100 | 100 | 100 | 100 | 100 |
| 4-methyl-3-methylcarbamyloximinotetrahydrothiophene | 100 | 100 | 100 | 100 | 100 |
| 2,4,4-trimethyl-3-methylcarbamyloximinotetrahydrothiophene | — | 100 | 100 | 50 | — |
| 4,4-dimethyl-3-methylcarbamyloximinotetrahydrothiapyran | — | 70 | 50 | — | — | red-banded leaf roller larvae are transferred to the leaf and the Petri dish is covered. These are held at 72° F for three days when mortality is determined. Results of insecticidal activity are given in Table 7:

TABLE 7

| Compound Tested | Percent Mortality at Concentration in ppm | | |
|---|---|---|---|
| | 1000 | 500 | 250 |
| 3-methylcarbamyloximinotetrahydrothiophene | 100 | 70 | 70 |
| 3-carbomethoxy-4-methylcarbamyloximinotetrahydrothiophene | 80 | 0 | — |
| 3,3-dimethyl-4-methylcarbamyloximinotetrahydrothiophene | — | 80 | 25 |
| 3-methylcarbamyloximinotetrahydrothiapyran | — | 62 | 14 |
| 2,4,4-trimethyl-3-methylcarbamyloximinotetrahydrothiophene | — | — | 65 |

EXAMPLE 24

Mexican Bean Beetle Leaf Spray Test

This test determines the insecticidal activity of the compound being tested against the Mexican bean beetle (*Epilachna varivestis*). The test procedure is the same as that described in Example 23 with the exception that one-day old larvae of the Mexican bean beetle instead of leaf roller larvae are used.

These tests are held at 72° F for three days when mortality and feeding inhibition are determined. The feeding inhibition is an indication of the repellent properties of the test material. Results of insecticidal activity are given in Table 8:

TABLE 8

| Compound Tested | Percent Mortality at Concentration in ppm | | | | | |
|---|---|---|---|---|---|---|
| | 1000 | 500 | 250 | 128 | 64 | 32 |
| 3-methylcarbamyloximinotetrahydrothiophene | 100* | 100* | 100* | 100* | 80* | 10 |
| 3-carbomethoxy-4-methylcarbamyloximinotetrahydrothiophene | 80* | 0 | — | — | — | — |
| 3,3-dimethyl-4-methylcarbamyloximinotetrahydrothiophene | — | 100* | 100* | 100* | 100* | 100* |
| 2,2-dimethyl-4-methylcarbamyloximinotetrahydrothiophene | — | 100* | 0 | — | — | — |
| 3-methylcarbamyloximinotetrahydrothiapyran | — | 100* | 100* | 100* | 100* | 30* |
| 3,3-dimethyl-4-allylcarbamyloximinotetrahydrothiophene | — | 100* | 100* | 100* | 100* | 0 |
| 3,3-dimethyl-4-ethylcarbamyloximinotetrahydrothiophene | — | 100* | 100* | 100* | 100* | 30 |
| 2,4,4-trimethyl-3-methylcarbamyloximinotetrahydrothiophene | — | — | 100* | 100* | 30 | — |
| 2,4,4-trimethyl-3-allylcarbamyloximinotetrahydrothiophene | — | 100* | 100* | 80* | 0 | — |
| 3-ethyl-3-methyl-4-methylcarbamyloximinotetrahydrothiophene | — | 100* | 90 | 80 | 0 | — |
| 3,3-dimethyl-4-methylcarbamyloximinotetrahydrofuran | — | 100* | 100* | 80* | 30 | — |
| 3-methyl-3-methylthio-4-methylcarbamyloximinotetrahydrothiophene | — | 100* | 100* | 100* | 100* | 50 |
| 4-methyl-3-methylcarbamyloximinotetrahydrothiophene | — | 100* | 100* | 100* | 40 | — |
| 4,4-dimethyl-3-methylcarbamyloximinotetrahydrothiapyran | — | — | 100 | 80 | 40 | — |

*Indicates inhibition of feeding.

EXAMPLE 25

Viricide Test

Test compounds are examined for ability to control southern bean mosaic on Pinto bean and maize dwarf virus on Golden Bantam sweet corn. Stock formulations containing 1000 ppm of each test compound are prepared using the procedure of Example 17 except that the amount of chemical used is 0.1 g instead of 0.05 g and are used in both the soil drench and the foliage spray treatments. Virus inoculation is made by the carborundum leaf abrasion method 1 to 2 hours prior to treatment.

In the foliage spray application, 67 ml of the stock test formulation at 1000 ppm are uniformly sprayed on the plants. In the soil drench treatment, the stock test formulation is also applied at the soil surface of each pot prior to spray at a dosage of the test chemical of 64 pounds per acre or 32 pounds per acre. Effective control is determined through visual observation of the presence or absence of viral infection symptoms ten days after inoculation. Using this procedure, the results shown in Table 9 are obtained:

EXAMPLE 26

Root-knot Nematocide Test

This test is an evaluation of the effectiveness of the compounds of this invention against infection by root-knot nematodes (*Meloidogyne spp.*).

Composted greenhouse soil, diluted by one-third with clean washed sand, is infested with about two grams of knotted or galled tomato roots per pot. Treatment is accomplished by applying 25 ml of the formulated chemical onto the infested soil. The formulation contains 0.056 g of the test chemical, 1.0 ml stock emulsifier solution (0.25 percent Triton X-155 in acetone by volume), 24.0 ml deionized water giving a concentration of 2240 ppm. Lower concentrations are achieved by dilution.

After treatment with the test chemical, the soil, inoculum, and chemical are thoroughly mixed, returned to the pot and the mixture incubated for seven days at 20° C and constant moisture. After incubation with the first chemical in the table, two seedlings of Rutgers tomato transplants and three Windsor bean (*Vicia faba*) seeds are set in each pot. After incubation with the remaining six chemicals in the table, two seedlings of Rutgers tomato transplants and three garden nasturtium (*Nasturtium spp.*) seeds are set in each pot. Roots are removed from the soil after three weeks of growth and rated for gall (root-knot nematode infection) formation. Windsor bean roots or nasturtium are evaluated only when necrosis of the tomato host has occurred. A rating of infection from 0 to 10 is recorded: 0 = no galls or complete control and 10 = heavily galled roots comparable to controls. Each of the root systems is rated separately and the average is multiplied by 10 and subtracted from 100 to give percent nematode control. Results of the tests are shown in Table 10:

TABLE 9

| Compound | Dosage | | Percent Control | |
|---|---|---|---|---|
| | lbs/acre | ppm | Bean | Corn |
| 2,2-dimethyl-4-methylcarbamyloximinotetrahydrothiophene | 64 | 1000 | 100 | |
| 2,2-dimethyl-3-carbethoxytetrahydrothiophen-4-one | 64 | 1000 | | 100 |
| 3-methyl-3-methylthiotetrahydrothiophen-4-one oxime | 32 | 500 | | 100 |

TABLE 10

| Compound Tested | Percent Control at Concentration in lbs/acre | | | | | |
|---|---|---|---|---|---|---|
| | 64 | 32 | 16 | 8 | 4 | 2 | 1 |
| 3-methylcarbamyloximinotetrahydrothiophene | 100 | 95 | 0 | — | — | — | — |
| 3,3-dimethyl-4-methylcarbamyloximinotetrahydrothiophene | 100 | 100 | 100 | 100 | 100 | 90 | 50 |
| 3,3-dimethyl-4-ethylcarbamyloximinotetrahydrothiophene | 100 | 100 | 0 | — | — | — | — |
| 3,3-dimethyl-4-allylcarbamyloximinotetrahydrothiophene | 100 | 40 | 40 | — | — | — | — |
| 2,4,4-trimethyl-3-methylcarbamyloximinotetrahydrothiophene | 100 | 100 | 0 | — | — | — | — |
| 3-ethyl-3-methyl-4-methylcarbamyloximinotetrahydrothiophene | 100 | 80 | 30 | — | — | — | — |
| 3-methyl-3-methylthio-4-methylcarbamyloximinotetrahydrothiophene | 100 | 85 | 70 | 50 | — | — | — |

EXAMPLE 27

Greenhouse Whitefly Test

Young tomato plants in 3½-inch clay pots are treated by soil drench at the rate of chemical indicated in the following test results and exposed to a heavy population of whitefly adults in the greenhouse for seven days. The plants are treated by pouring the chemical formulation in a test solution on the soil at rates of 8 or less pounds per acre. Stock formulations containing 500 ppm of the test chemicals are prepared and diluted by the procedure described in Example 17. After seven days, there was a high density of eggs on the check plants and all plants were moved to a holding room. Fifteen days after treatment, the total number of live larvae on the third and fourth leaves was determined and the percent control calculated. Results of this test are shown in Table 11:

TABLE 11

| Compound Tested | Concentration lbs/acre | Percent Control |
|---|---|---|
| 3,3-dimethyl-4-methylcarbamyl-oximinotetrahydrothiophene | 8 | 99 |
| | 2 | 64 |
| | 0.5 | 41 |

EXAMPLE 28

Boll Weevil Test

Adult boll weevil insects in cylindrical fly cages, of the type used in Example 22, were sprayed with a suspension of the tested chemical named below and later supplied sugar water using the standard technique of placing the water to be available to feed the insects. Mortality counts were made three days later. Stock formulations containing 500 ppm of the test chemicals are prepared and diluted by the procedure described in Example 17. Results of this test are shown in Table 12:

TABLE 12

| Compound Tested | Concentration ppm | Percent Mortality |
|---|---|---|
| 3,3-dimethyl-4-methylcarbamyl-oximinotetrahydrothiophene | 243 | 100 |
| | 81 | 100 |
| | 27 | 100 |
| | 9 | 60 |
| | 3 | 10 |

EXAMPLE 29

Bactericides

Test formulations are examined for ability to inhibit the colonial growth of *Xanthomonas phaseoli* (X.p.), at various concentrations. The basic test formulation contains 0.125 g of the test chemical (or 0.125 ml if a liquid), 4.0 ml stock emulsifier solution (0.25 percent Triton X-155 in acetone by volume) and 96.0 ml deionized water, the concentration of toxicant in this formulation being 1250 ppm. Lower concentrations of toxicant are obtained by diluting the basic formulation with distilled water.

Two ml of the formulation is dispensed into a test tube which is then placed into a water bath maintained at 47° C. From a stock preparation (also held at 47° C), 8 ml of Difco nutrient agar is added to the test tube giving a 1:5 dilution or a final concentration of 250 ppm chemical in the agar. The contents of the test tube are then thoroughly mixed, while still warm, with the aid of a Vortex type mixer and immediately poured into a sterile polystyrene Petri dish (100 × 15 mm). After the agar in the plate is set, a suspension of the organism is streaked onto the surface of the agar. After the plate is inoculated, it is incubated 24 to 48 hours at 30° C, after which time the organism is rated visually for growth inhibition by the candidate chemical. Estimates of percent growth inhibition are relative to growth of a streak colony in control plates obtained during individual tests. Using this procedure, the results shown in Table 13 are obtained:

TABLE 13

| Compound | Concentration ppm | Percent Control X.p. |
|---|---|---|
| 2,4,4-trimethyltetrahydrothiophen-3-one oxime | 128 | 50 |
| 2,2-dimethyltetrahydrothiophen-4-one | 250 | 50 |

It is to be understood that although the invention has been described with specific reference to particular embodiments thereof, it is not to be so limited since changes and alterations therein may be made which are within the full intended scope of this invention as defined in the appended claims.

What is claimed is:

1. A method of controlling insects and acarids which comprises contacting same with a pesticidally effective amount of 4-methyl-3-methylcarbamyloximinotetrahydrothiapyran.

* * * * *